United States Patent
Luo et al.

(10) Patent No.: US 11,789,838 B2
(45) Date of Patent: Oct. 17, 2023

(54) SYSTEMS AND METHODS FOR SERVER CRASH PREVENTION

(71) Applicant: MicroStrategy Incorporated, Tysons Corner, VA (US)

(72) Inventors: Yi Luo, Shanghai (CN); Kaijie Yang, Hangzhou (CN); Xianting Lu, Herndon, VA (US); Sigit Pambudi, Ashburn, VA (US)

(73) Assignee: MicroStrategy Incorporated, Tysons Corner (VA)

( * ) Notice: Subject to any disclaimer, the term of this patent is extended or adjusted under 35 U.S.C. 154(b) by 74 days.

(21) Appl. No.: 17/649,375

(22) Filed: Jan. 31, 2022

(65) Prior Publication Data

US 2023/0244584 A1   Aug. 3, 2023

(51) Int. Cl.

| G06F 15/16 | (2006.01) |
| G06F 9/54 | (2006.01) |
| H04L 29/06 | (2006.01) |
| G06F 11/30 | (2006.01) |
| G06F 11/34 | (2006.01) |
| G06F 9/4401 | (2018.01) |
| G06F 9/50 | (2006.01) |
| G06F 11/07 | (2006.01) |

(52) U.S. Cl.
CPC ........ *G06F 11/3006* (2013.01); *G06F 9/4418* (2013.01); *G06F 9/5022* (2013.01); *G06F 11/0772* (2013.01); *G06F 11/3051* (2013.01); *G06F 11/3476* (2013.01)

(58) Field of Classification Search
CPC . G06F 11/3051; G06F 9/5022; G06F 16/2336
USPC .......................................................... 709/221
See application file for complete search history.

(56) References Cited

U.S. PATENT DOCUMENTS

| 5,551,046 A | * | 8/1996 | Mohan ...................... G06F 9/52 |
| | | | 711/119 |
| 5,734,909 A | * | 3/1998 | Bennett ..................... G06F 9/52 |
| | | | 710/200 |
| 6,108,654 A | * | 8/2000 | Chan ......................... G06F 9/52 |
| | | | 710/200 |
| 6,189,007 B1 | * | 2/2001 | Boonie ............... G06F 16/2343 |
| | | | 714/12 |

(Continued)

*Primary Examiner* — Hamza N Algibhah
(74) *Attorney, Agent, or Firm* — Bookoff McAndrews, PLLC

(57) ABSTRACT

Disclosed are methods, systems, and computer-readable medium for preventing system crashes, including loading a resource from a real resource location; receiving a registration request from a resource user; registering the resource user by updating a resource owner registration list to indicate the resource user registration; receiving a first unload request and determining that the resource user is registered by accessing the registration list; upon determining that the resource user is registered, denying the first unload request; generating a stop use request; transmitting the stop use request to the resource user; receiving a deregistration request from the resource user, based on the stop use request; deregistering the resource user by updating the resource owner registration list; receiving a second unload request after deregistering the resource user; and approving the second unload request to unload the resource.

20 Claims, 9 Drawing Sheets

(56) References Cited

U.S. PATENT DOCUMENTS

| | | | | |
|---|---|---|---|---|
| 6,715,146 | B1* | 3/2004 | Simmons | G06F 9/526 |
| | | | | 709/229 |
| 8,024,361 | B2* | 9/2011 | Daughtry | G06F 21/604 |
| | | | | 707/786 |
| 9,256,600 | B2* | 2/2016 | Auger | G06F 16/93 |
| 9,967,196 | B2* | 5/2018 | Lehmann | G06F 9/5011 |
| 2003/0004924 | A1* | 1/2003 | Williams | G06F 16/2343 |
| 2005/0137731 | A1* | 6/2005 | Haag | G06Q 30/0621 |
| | | | | 700/97 |
| 2006/0015741 | A1* | 1/2006 | Carroll | H04L 63/101 |
| | | | | 713/182 |
| 2006/0129540 | A1* | 6/2006 | Hillis | G06F 16/9535 |
| 2006/0167878 | A1* | 7/2006 | Hartman | G06Q 40/08 |
| 2008/0010283 | A1* | 1/2008 | Cornwell | G06F 16/2343 |
| 2009/0282042 | A1* | 11/2009 | Russell | G06F 16/258 |
| | | | | 707/999.008 |
| 2012/0066390 | A1* | 3/2012 | Salsbery | G06F 9/50 |
| | | | | 709/226 |
| 2012/0323873 | A1* | 12/2012 | Mistry | G06F 16/2336 |
| | | | | 707/704 |
| 2013/0019249 | A1* | 1/2013 | Gargash | G06F 9/44505 |
| | | | | 718/104 |
| 2013/0031560 | A1* | 1/2013 | Gargash | G06F 11/3013 |
| | | | | 718/104 |
| 2019/0197151 | A1* | 6/2019 | Hrasko | G06F 16/21 |
| 2020/0151233 | A1* | 5/2020 | Hillis | G06F 16/955 |
| 2022/0083400 | A1* | 3/2022 | Brevdo | G06F 16/9024 |

* cited by examiner

SYSTEMS AND METHODS FOR SERVER CRASH PREVENTION

TECHNICAL FIELD

Various embodiments of the present disclosure relate generally to methods and systems for server crash prevention and, more specifically, to resource loading and unloading management to mitigate crashes (e.g., due to incorrect memory calls).

BACKGROUND

Intelligence server (iServer) crashes occur during project-based resource use and/or requests. Such crashes can occur for a number of reasons such as a crawl or indexing operation (e.g., to update a search index) conducted while one or more resources to be indexed have been released by iServer (e.g., as part of a cleanup or shut down process). A crawl or indexing operation may target invalid resources (e.g., in released memory), resulting in an iServer crash. As another example, iServer crashes can occur during a task update process that is triggered upon modification of an iServer. The update may trigger a crawl or indexing operation. However, if the crawl or indexing operation is conducted while one or more resources to be indexed have been released by iServer (e.g., as part of a cleanup or shut down process), such an operation may result in an iServer crash.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, methods, and computer-readable medium are disclosed for server crash prevention. For instance, a system may include at least one memory storing instructions and at least one processor executing the instructions to perform operations, the operations including loading a resource from a real resource location; receiving a registration request from a resource user; registering the resource user by updating a resource owner registration list to indicate the resource user registration; receiving a first unload request and determining that the resource user is registered by accessing the registration list; upon determining that the resource user is registered, denying the first unload request; generating a stop use request; transmitting the stop use request to the resource user; receiving a deregistration request from the resource user, based on the stop use request; deregistering the resource user by updating the resource owner registration list; receiving a second unload request after deregistering the resource user; and approving the second unload request to unload the resource.

Furthermore, a system may include at least one memory storing instructions and at least one processor executing the instructions to perform operations, the operations including loading a resource from a real resource location; receiving a registration request from a resource user; registering the resource user by updating a resource owner registration list to indicate the resource user registration; receiving a first unload request and determining that the resource user is registered by accessing the registration list; upon determining that the resource user is registered, denying the first unload request; generating a stop use request; transmitting the stop use request to the resource user; determine a null use of the resource by the resource user; deregistering the resource user by updating the resource owner registration list, based on the null use; receiving a second unload request after deregistering the resource user; and approving the second unload request to unload the resource.

Furthermore, a system may include at least one memory storing instructions and at least one processor executing the instructions to perform operations, the operations including loading a resource from a real resource location; receiving a registration request from a resource user; registering the resource user by updating a resource owner registration list to indicate the resource user registration; receiving a first unload request and determining that the resource user is registered by accessing the registration list; upon determining that the resource user is registered, denying the first unload request; generating a stop use request; transmitting the stop use request to the resource user; determining that the resource owner is in a sleep state; deregistering the resource user by updating the resource owner registration list, based on the determining that the resource owner is in a sleep state; receiving a second unload request after deregistering the resource user; and approving the second unload request to unload the resource.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
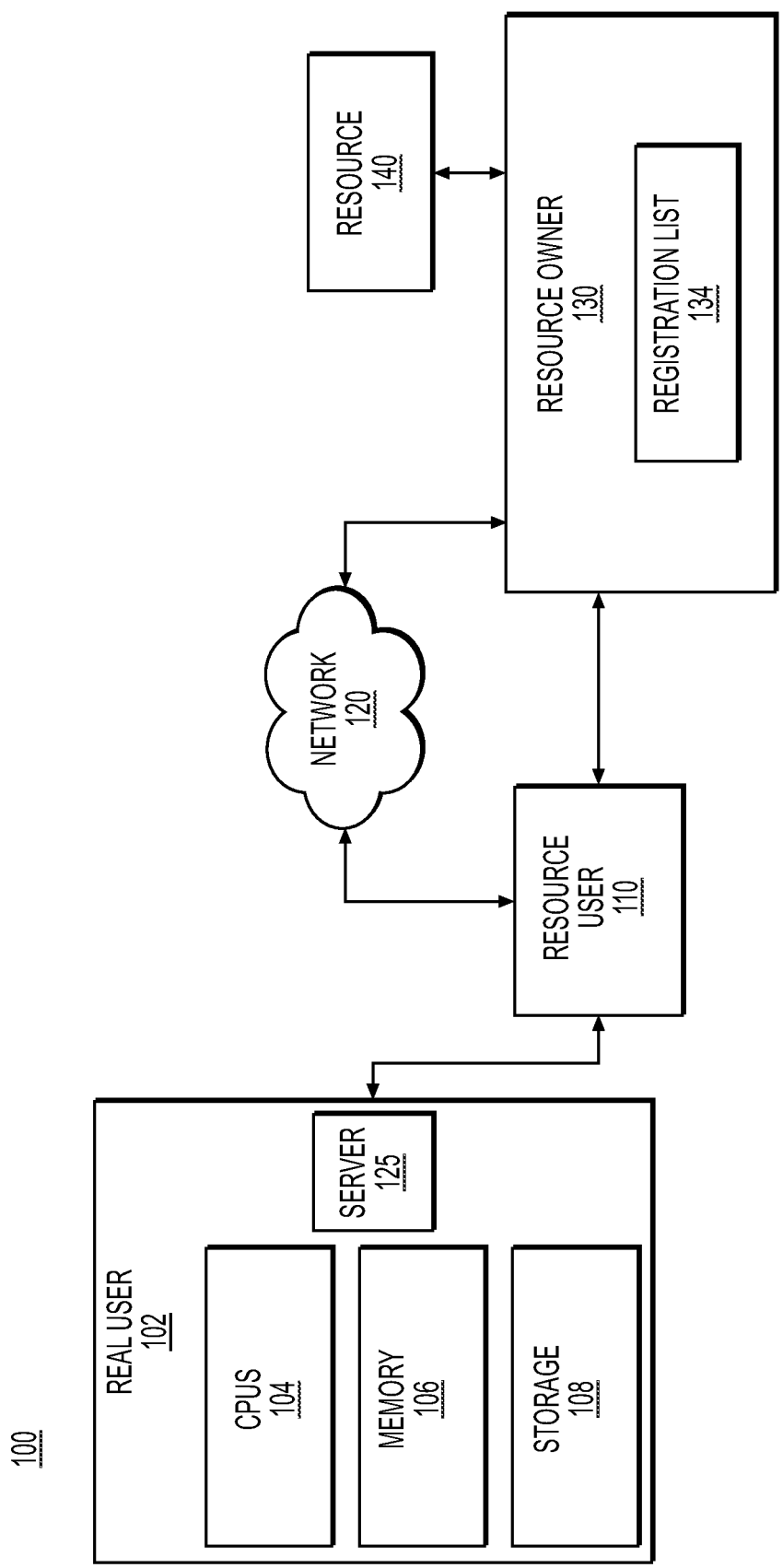
FIG. 1 depicts an exemplary block diagram of a system, according to one or more embodiments.

Various embodiments of the present disclosure relate generally to methods and systems for server crash prevention based on resource management.

In general, the present disclosure is directed to improving technology used to allocate resources for resource users. Implementations disclosed herein are directed to resource retrieval based on availability of the resources. The availability of resources may be tracked by a resource owner such that a destroy operation associated with a previously allocated resource may be prevented until the resource is released from usage by all its one or more users.

As applied herein, a CPU may include one or more processors and/or may drive components of an electronic system to perform commands (e.g., based on user input, code, etc.). One or more CPUs may be connected to motherboards. A CPU may switch back and forth between various tasks to augment multitasking. This may increase the effective processor speed of the CPU. A given CPU may operate in accordance with an operating system (e.g., an operating system running on a VM). A multi-core CPU may include more than one component. A bus interface component may transfer data to and from the CPU and/or one or more components. A server CPU may provide enterprise level scalability and performance.

As applied herein, a memory may include a device or system that is used to store information for immediate use in a computer or related computer hardware and digital electronic devices. Memory may operate at a high speed compared to storage, as applied herein. Storage may provide slower access to data in comparison to memory. Contents of memory can be transferred to storage (e.g., via virtual memory). Memory may be implemented as semiconductor memory, where data is stored within memory cells built from MOS transistors on an integrated circuit. Semiconductor memory may include volatile and/or non-volatile memory. Examples of non-volatile memory include flash memory and read-only memory (ROM), programmable read-only memory (PROM), erasable programmable read-only memory (EPROM), electrically erasable programmable read-only memory (EEPROM) memory, and the like. Examples of volatile memory include primary memory such as dynamic random-access memory (DRAM) and fast CPU cache memory such as static random-access memory (SRAM).

As applied herein, a real resource (or "resource"), may be any object (e.g., a software object, a memory resource, a code, a physical resource, a computing resource, or the like), that can be accessed by multiple resource users. The object may store its state in fields (e.g., member variables in some programming languages) and may exhibit behavior through methods (e.g., member functions in some programming languages). A resource may be specific to one resource owner. On the other hand, a resource may be specific to a plurality of given resource users such that the object may only be used by those plurality of given resource users. An example resource may be a data structure including context information needed to support data analysis in a specific project.

According to implementations, a resource may be stored, applied using, or otherwise implemented using a memory, processor, storage, and/or the like. The resource may be associated with a resource owner that is tasked with management of the resource.

As applied herein, a resource owner may be associated with and/or may manage one or more projects. An example resource owner may be a software component that manages projects in a given system, and may be responsible for unloading a project from the memory upon instructed by a system administrator. An example project in a business intelligence system may be a collection of business performance metrics and reports for retail stores. Each of the one or more projects may be associated with and/or use one or more resources that are called upon by resource users. A resource owner may manage the use of a given resource as disclosed herein. The resource owner may enable one or more resource users to register for use of a given resource. As further discussed herein, according to implementations, the resource owner may manage a registration list for each resource. The registration list may track whether a resource user has registered for use of a given resource or whether the given resource is unused (e.g., no resource user has registered for use of the given resource).

As applied herein, a resource user may register for use of a resource with a resource owner. The resource user may facilitate access to a given resource for which the resource user has registered for (e.g., registered with a corresponding resource owner). The resource user may facilitate access between the resource and a real user such that, for example, a real user may request access to the resource via the resource user, request use of the resource once the access is granted, request deregistration once its use of the resource is completed. Accordingly, the resource user may be a go-between between a resource owner and a real user.

As applied herein, a real user may be a component that may use a resource to generate an output, to facilitate an operation, and/or to cause an action to be taken. An example of a real user may be a search engine index generator component, which may use the project context data to load new contents to generate a corresponding search index.

Any one of a real resource, resource owner, resource user, and/or real user may include or may be implemented using a processor (e.g., one or more CPUs, microprocessors, etc.), memory, storage, and/or using one or more cloud components. Any such components may communicate using a network (e.g., a local network, a wide area network, a cloud network, etc.).

According to implementations of the disclosed subject matter, server (e.g., iServer) crashes may be stopped by preventing a resource management request for a given resource from being made while the resource is actively used by users. The resource management request may be, for example, to delete a resource during a clean-up process, and may be made while the resource is being used by a resource user and/or real user. By preventing such a request (e.g., a delete request) to be implemented while a given resource is in use, a corresponding server crash (e.g., malfunction) can be prevented.

A request for a given resource may be prevented from being made while the resource is actively used by one or more users by implementing a registration process. The registration process may require a resource user registration (e.g., using a registration list) such that while a resource user is registered for use of a given resource, a resource management request will be denied. A denied resource management request may trigger a stop usage command, which may cause a resource user or real user to deregister and stop use of the given resource. The stop usage command may be generated based on, for example, a cleanup operation, shutdown operation, or the like. Successful completion of the stop usage command may result in a subsequent resource management request (e.g., to delete the resource during a cleanup process) to be approved. By rejecting a resource management request while the resource is registered to a resource user, a potential call for a resource from a location that the resource does not or no longer exists, may be prevented. By implementing the stop usage request to prevent further use by the resource user and/or real user, a given resource management request can be initiated without prohibitive time delays.

Accordingly, techniques disclosed herein improve technical operation of a database, processor, and/or resource management system. These techniques prevent server crashes caused by, for example, resource calls from locations (e.g., memory locations) that do not or no longer include a given resource. Server crashes based on unauthorized use of resources, overlap in resource requests, or the like may also be prevented in accordance with the techniques disclosed herein. It will be understood that prevention of server crashes can mean prevention of software crashes, prevention of hardware crashes, mitigation of crashes, a lower probability of crashes, and/or the like. Prevention of server crashes may allow for continued operation of a technological component, thereby improving the inherent technology associated with the component. Prevention of server crashes may also increase the speed of technological components by allowing operation without having to re-start or re-configure resources.

FIG. 1 depicts an exemplary environment 100 in which systems, methods, and other aspects of the present disclosure may be implemented. Environment 100 may include real users 102 that include one or more CPUs 104, memory 106, and storage 108. Real users 102 may include, be managed through, or may incorporate one or more server(s) 125, which may communicate with a network 120 in a wired or wireless manner. According to an implementation, server 125 may be a cloud-based server. Real users 102 may be hardware resources that are located in one or more resource locations. Each of the depicted resources (e.g., CPUs 104, memory 106, and storage 108) may be located in the same resources location or may be located in different resource locations. Additionally or alternatively, a subset of each of the resources (e.g., a portion of the overall CPUs) may be located in a first location and a different subset may be located in a second different location. It will be understood that real user 102 may be a software or firmware component and may not include CPUs 104, memory 106, and/or storage 108.

Real user 102 may be in communication with a resource user 110. Alternatively, or in addition, resource user 110 may be a subset of real user 102 and/or may be an instance of real user 102. Real user 102 may be in communication with resource user 110 directly or indirectly. According to an implementation, real user 102 may operate by accessing resource user 110 such that resource user 110 loads one or more resources for use by real user 102. Accordingly, real user 102 may be in communication with one or more resource users 110 such that each resource user 110 is associated with a resource used by real user 102. According to this implementation, as further disclosed herein, a given resource user 110 may be registered with a resource owner for use of a resource 140 by real user 102 via resource user 110.

Resource owner 130 may track or distribute a given resource 140. Resource owner 130 may maintain a registration list 134. Registration list 134 may track (e.g., using and/or modifying binary values or any other applicable mechanism) whether a given resource 140 is registered to a given resource user 110 or real user 102. Registration list 134 may include tracking for multiple resources 140 and/or a unique registration list 134 may be maintained for each of a plurality of resources 140.

A resource 140 may be any object (e.g., a software object, a memory resource, a database connection, a code, a physical resource, a computing resource, or the like), that can be accessed by one or more resource users 110. The object may store its state in fields (e.g., variables in some programming languages) and may exhibit behavior through methods (e.g., functions in some programming languages). Resource 140 may be specific to a user 110 and/or resource owner 130. Alternatively, resource 140 may be specific to a plurality of given resource users 110 and/or resource owners 130 such that the resource 140 may only be used by those plurality of given resource users 110 and/or resource owner 130.

Figure 2A:
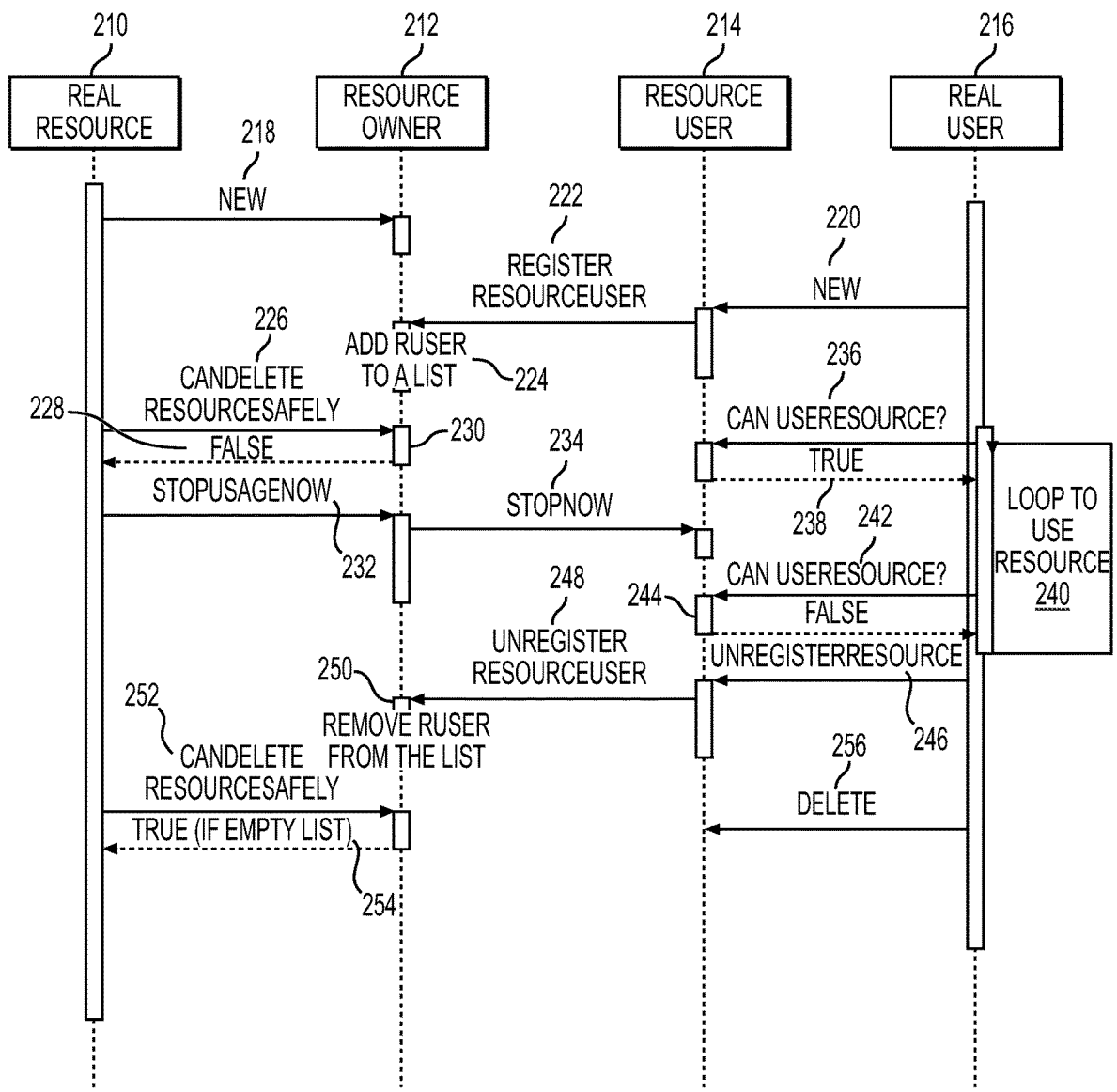
FIG. 2A depicts a flow diagram for resource allocation, according to one or more embodiments.

FIG. 2A depicts a flow diagram 200 for resource allocation. Resource 210 may be a real resource that is managed via resource owner 212 and may correspond to resource 140. Resource owner 212 may correspond to resource owner 130. Resource user 214 may correspond to resource user 110. Real user 216 may correspond to real user 102. At 218 of FIG. 2A, a resource 210 may be transmitted and may be received at a resource owner 212. Resource 210 may be received at resource owner 212 via a transmission of resource 210, based on an indication of availability of resource 210, based on a pointer to a resource location, or the like. Resource owner 212 may have access to or initiate a registration list 134 based on receiving the resource 210. As described herein, resource owner 212 may manage registration list 134 for each resource that the resource owner 212 manages. Alternatively, resource owner 212 may have a registration list 134 for a plurality of different resources, including resource 210.

At 220, real user 216 may transmit a new resource request 220 to resource user 214. The request 220 may be transmitted automatically based on a call for resource 210 at real user 216. Request 220 may identify resource 210 or resource user 214 may decipher request 220 to extract the identity of resource 210.

At 222, resource user 214 and/or real user 216 may be registered at resource owner 212. The registration may be triggered by the registration request at 222. A successful or unsuccessful registration may be indicated to resource user 214. For example, resource user 214 may receive an indication that the registration was unsuccessful or was successful. The registration request may originate at real user 216. At 224, the registration may be recorded (e.g., a binary register or software designation) at registration list 134 managed at resource user owner 212. The registration may include resource 210 information, resource user 214 information, real user 216 information, a time stamp, and/or resource type information.

At 230, after recording the registration at 224, the resource 210 may be locked (e.g. loaded) such that one or more actions (e.g., deletion request 226) of the resource 210 requested by a resource 210 component (e.g., a server) may be rejected at 228. The rejection 228 may be made based on an indication at resource owner 212 that the registration list 134 currently indicates resource user 214 and/or real user 216 as registering resource 210. For example, a review of registration list 134 may indicate the registration, and the indication of the registration may result in rejection 228.

While resource user 214 is registered at 224 for using real resource 210, a resource use request 236 by real user 216 to resource user 214 may be returned in the affirmative (e.g., true 238). Real user 216 may be afforded access to resource 210 based on the affirmative (e.g., true 238) response. Real user 216 may be granted access to resource 210 (e.g., via resource user 214) for any continued affirmative (e.g., true 238) responses to requests 236 made during loop 240.

At 230, a resource 210 component (e.g., server, clean-up operation, shut down operation, etc.) may trigger a stop usage now request 232. The stop usage now request 232 may be triggered based on the rejection 228 to the action (e.g., deletion request 226). Resource owner 212 may submit a stop now instruction 234 based on the stoppage usage now request 232. The stop now instruction 234 may be provided to resource user 214.

While resource user 214 is registered at 224 for using real resource 210, a resource use request 242 by real user 216 to resource user 214 may be received at resource user 214 (e.g., as part of loop 240 to use resource 210). Resource user 214 may determine, at 244, that a stop now instruction 234 has been received. Accordingly, resource user 214 may reject resource use request 242 based on determining, at 244, that the stop now instruction 234 has been received. As a result of the rejection, an instruction 246 to unregister resource 210 may be generated at real user 216 and provided to resource user 214. Additionally, resource 210 and/or the registered access to resource 210 may be deleted at 256. The deletion may be recorded and/or accepted by resource user 214.

At 248, resource user 214 may submit an unregister resource user request 248, based on the determination at 244. Resource owner 212 may remove real user 216 and/or resource user 214 from registration list 134 at 250, based on the unregister resource user request 248. The removal of real user 216 and/or resource user 214 from registration list 134 may include updating registration list 134 (e.g., a binary designation) to indicate that real user 216 and/or resource user 214 is no longer registered. Effectively, the removal of real user 216 and/or resource user 214 from registration list 134 may allow for an action to be conducted related to resource 210 (e.g., deletion) by a component (e.g., server).

At 252, a request one or more actions (e.g., deletion request) of the resource 210 may be received at resource owner 212, from resource 210 and/or a component associated with resource 210. At 254, based on the removal of real user 216 and/or resource user 214 from registration list 134 at 250, an affirmative response (e.g., true 254) may be received from resource owner 212.

Accordingly, based on flow diagram 200, resource 210 may be used by a real user 216 via resource user 214. The use of resource 210 may be uninterrupted by, for example, a deletion or other action related to resource 210. Further, based on flow diagram 200, an action triggered by a component (e.g., a server, a cleanup task, etc.) may not be executed until resource 210 is unregistered from real user 216. By preventing such action until resource 210 is unregistered from real user 216, server crashes may be prevented or mitigated. For example, a cleanup task may not delete resource 210 while real user 216 is registered for using resource 210. By preventing or mitigating server crashes, one or more resources (e.g., processors, servers, databases, etc.) may continue to operate as required. Such operation may increase reliability of the one or more resources and may increase uptime (e.g., the amount of time the resource is available for use).

Figure 3A:
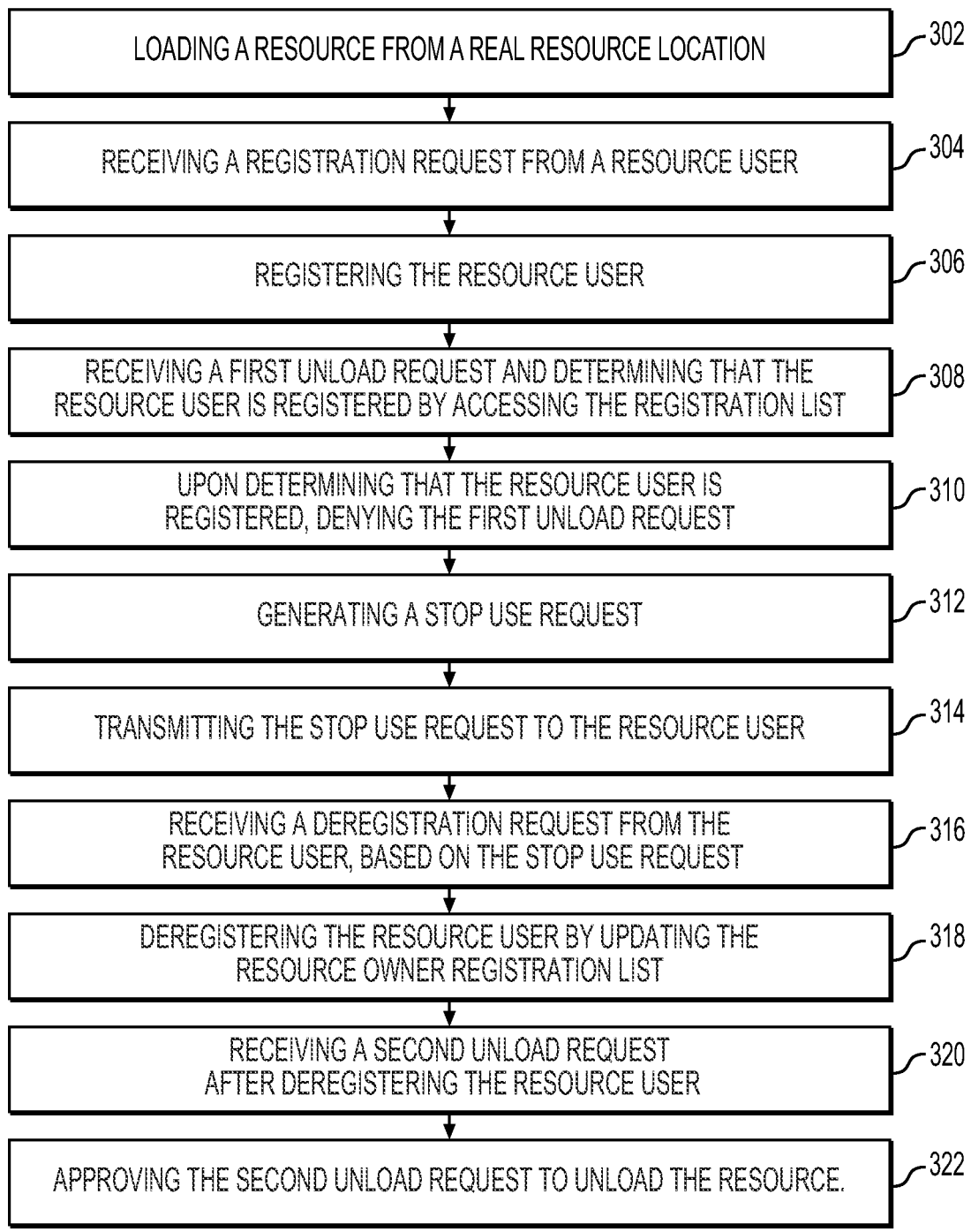
FIG. 3A depicts a flowchart corresponding to FIG. 2A, according to one or more embodiments.

FIG. 3A depicts a flowchart 300 for a process associated with flow diagram 200 of FIG. 2A. At 302, a resource (e.g. resource 210) may be loaded from a resource location. The resource location may be a memory or storage, and may be part of a database (e.g., a cloud database). For example, a resource location may be a portion of a resource library. The resource may be loaded onto a given project or other resource loading component, and may correspond to the activation of a resource itself. The activation may indicate that a given resource is available.

At 304, a registration request may be received from a resource user (e.g., resource user 214). The resource user may be associated with a real user (e.g., real user 216). The registration request may be received at a resource owner (e.g., resource owner 212) associated with the resource. The registration request may include identifying information for the resource user and/or real user.

At 306, the resource user may be registered. The registration may include marking the resource as registered to the resource user (or real user). The registration may be made using a registration list (e.g., registration list 134). For example, the registration list may be updated to include identifying information of the resource user. Alternatively, the registration request may indicate that the resource is registered, without specifying the resource user that the resource is registered to. As an example, a binary designation may be used at the registration list. A registered resource may be designated with a designation of '1' whereas an unregistered resource may be designated with a designation of '0'.

At 308, a first unload request may be received. The unload request may be triggered by a component (e.g., a server, cleanup task, etc.) associated with the resource. A determination may be made that the resource is managed by the resource user and if there is any resource user registered to the resource owner. The determination that a resource user is registered may be made based on a registration list indicating the registration to the resource owner. Based on the determination if the resource is being managed and if there exists any registered resource user, the unload request may be denied at 310. Based on the denial, an intended action (e.g., a deletion or unloading of the resource) may prevented (e.g., not triggered). By preventing actions while the resource is registered, server crashes may be prevented or mitigated.

At 312, a stop request may be generated. The stop request may initiate an unregister process of the resource, so that the intended action can be carried out. At 314, the stop request may be transmitted to the resource user. At 316, a deregistration (unregister) request may be received from the resource user, based on the stop use request. The deregistration request may be generated, for example, after the real resource requests use of the resource, subsequent to the stop request being transmitted at 314.

At 318, the resource user may be deregistered (e.g., from registration list 134). The resource user may be deregistered based on the deregistration request at 316. The registration list may be updated to implement the deregistration (e.g., the resource may be designated with a '0' instead of '1'). At 320, a second unload request may be received. The second unload request may be triggered by a component (e.g., a server, cleanup task, etc.) associated with the resource. A determination may be made that the resource is not registered to the resource owner or resource user, based on the deregistration at 318. Based on the determination, the second unload request may be approved at 322, and the resource may be unloaded.

Figure 2B:
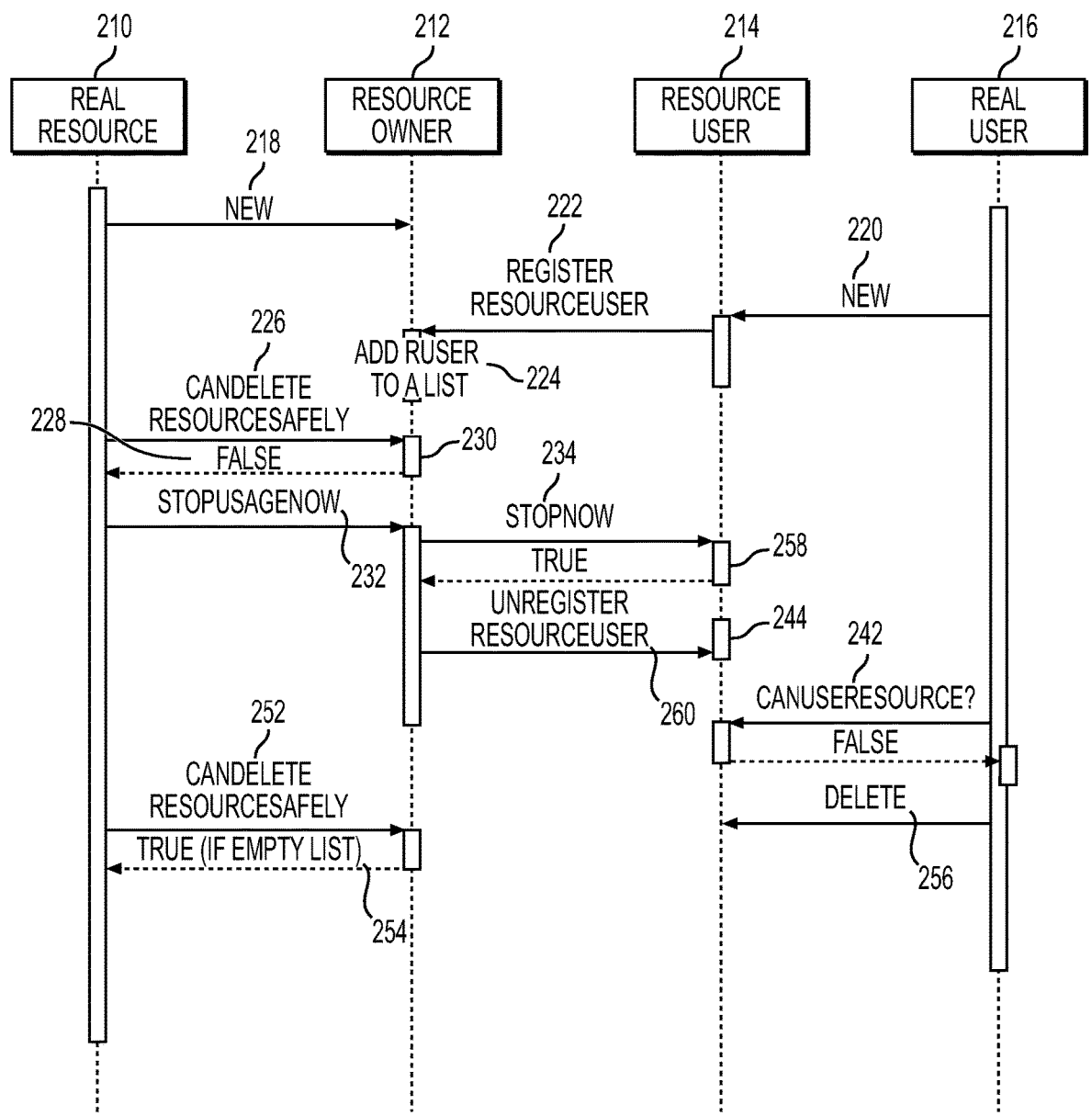
FIG. 2B depicts another flow diagram for resource allocation, according to one or more embodiments.

FIG. 2B depicts a flow diagram 201 for resource allocation. Flow diagram 202 is similar to flow diagram 200 of FIG. 2A. However, in flow diagram 201, an implementation where real user has not used resource 210 is described. For example, in FIG. 2B, when compared to FIG. 2A, loop 240 has not received an affirmative response (e.g., true 238) to a resource use request (e.g., at 236). Accordingly, FIG. 2B describes an implementation where resource 210 has not been used. For completeness, references identified in FIG. 2A are repeated below in reference to FIG. 2B. It will be understood that a reference with the same reference number may be similarly applied in both FIG. 2A and FIG. 2B.

At 218 of FIG. 2B, a resource 210 may be transmitted and may be received at a resource owner 212. Resource 210 may be received at resource owner 212 via a transmission of resource 210, based on an indication of availability of resource 210, based on a pointer to a resource location, or the like. Resource owner 212 may have access to or initiate a registration list 134 based on receiving the resource 210. At 220, real user 216 may transmit a new resource request 220 to resource user 214. The request 220 may be transmitted automatically based on a call for resource 210 at real user 216. Request 220 may identify resource 210 or resource user 214 may decipher request 220 to extract the identity of resource 210.

At 222, resource user 214 and/or real user 216 may be registered at resource owner 212. The registration may be triggered by the registration request at 222. A successful or unsuccessful registration may be indicated to resource user 214. For example, resource user 214 may receive an indication that the registration was unsuccessful or was successful. At 224, the registration may be recorded (e.g., a binary register or software designation) at registration list 134 managed at resource user owner 212. The registration may include resource 210 information, resource user 214 information, real user 216 information, a time stamp, and/or resource type information.

At 230, after recording the registration at 224, the resource 210 may be locked (e.g. loaded) such that one or more actions (e.g., deletion request 226) of the resource 210 requested by a resource 210 component (e.g., a server) may be rejected at 228. The rejection 228 may be made based on an indication at resource owner 212 that the registration list 134 currently indicates real user 216 as being registered for use of resource 210. For example, a review of registration list 134 may indicate the registration, and the indication of the registration may result in rejection 228.

At 232, a resource 210 component (e.g., server, clean-up operation, shut down operation, etc.) may trigger a stop usage now request 232. The stop usage now request 232 may be triggered based on the rejection 228 to the action (e.g., deletion request 226). Resource owner 212 may submit a stop now instruction 234 based on the stoppage usage now request 232. The stop now instruction 234 may be provided to resource user 214. At 258, a determination may be made that real user 216 has not used resource 210 based on determining that no resource use request (e.g., request 236 of FIG. 2A) has been submitted from real user 216 to resource user 214. Accordingly, the stop now instruction 234 may result in an affirmative response. An unregister user command 260 may be sent from resource owner 212 to resource user 214, based on real user 216 not using resource 210 when the stop now instruction 234 is received.

While resource user 214 is registered at 224 for using real resource 210, a resource use request 242 by real user 216 to resource user 214 may be received at resource user 214. As shown in FIG. 2B, the resource use request 242 may be the first resource use request in this implementation. As shown, this first resource use request may be generated after unregister user command 260. Accordingly, resource user 214 may determine, at 244 that stop now instruction 234 has been received. Accordingly, resource user 214 may reject resource use request 242 based on determining, at 244, that the stop now instruction 234 has been received. As a result of the rejection, resource 210 and/or the registered access to resource 210 may be deleted at 256. The deletion may be recorded and/or accepted by resource user 214. Registration list 134 may be updated to unregister resource user 214 and/or real user 216.

At 252, a request one or more actions (e.g., deletion request) of the resource 210 may be received at resource owner 212, from resource 210 and/or a component associated with resource 210. At 254, based on the removal of real user 216 and/or resource user 214 from registration list 134, an affirmative response (e.g., true 254) may be received from resource owner 212.

Accordingly, based on flow diagram 201, resource 210 may be used by a real user 216 via resource user 214. The use of resource 210 may be uninterrupted by, for example, a deletion or other action related to resource 210. The stop now request 234 may be prioritized based on real user 216 not having used resource 210. Further, based on flow diagram 201, an action triggered by a component (e.g., a server, a cleanup task, etc.) may not be executed until resource 210 is unregistered from real user 216. By preventing such action until resource 210 is unregistered from real user 216, server crashes may be prevented or mitigated. For example, a cleanup task may not delete resource 210 while real user 216 is registered for using resource 210. By preventing or mitigating server crashes, one or more resources (e.g., processors, servers, databases, etc.) may continue to operate as required. Such operation may increase reliability of the one or more resources and may increase uptime (e.g., the amount of time the resource is available for use).

Figure 3B:
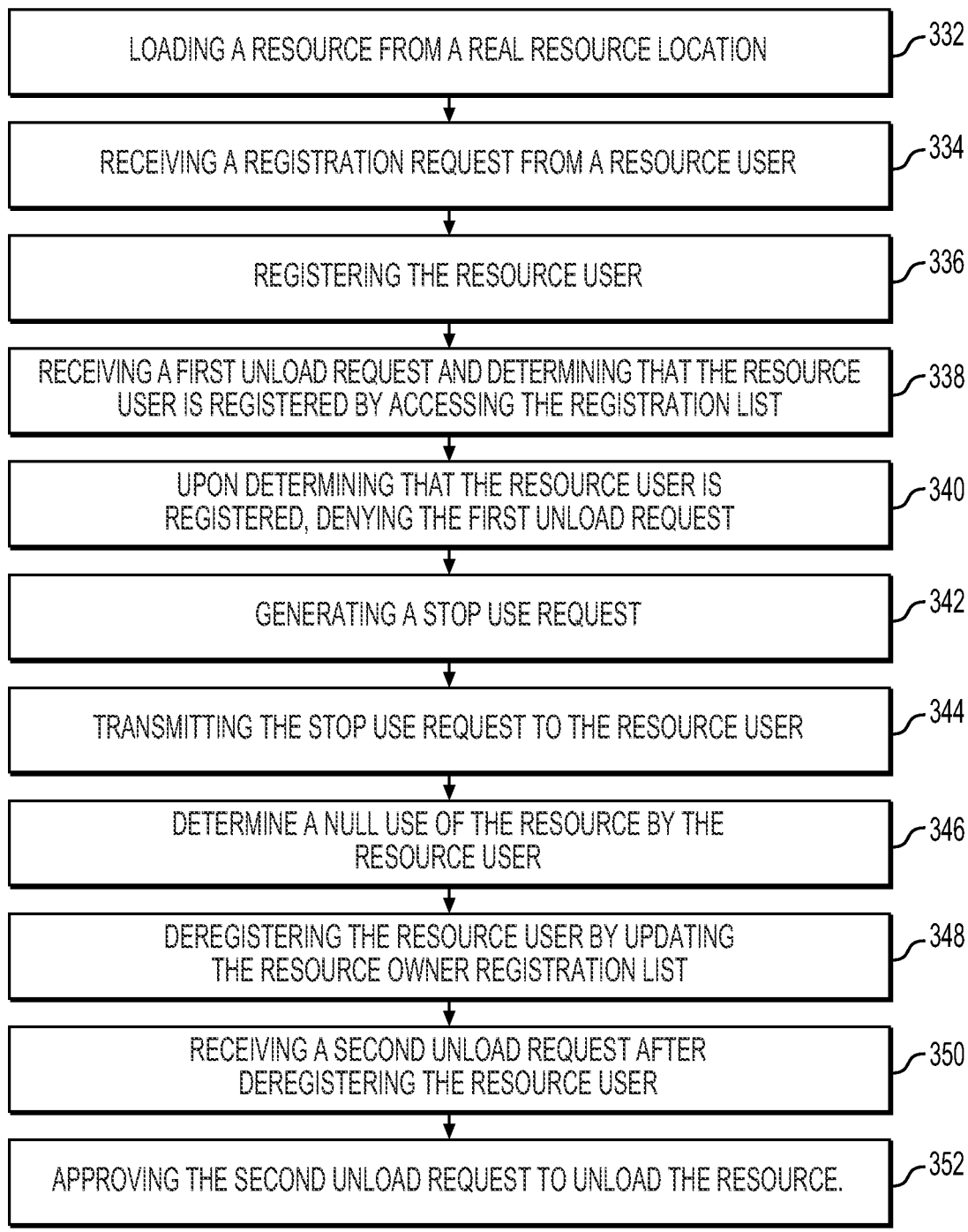
FIG. 3B depicts a flow flowchart corresponding to FIG. 2B, according to one or more embodiments.

FIG. 3B depicts a flowchart 330 for a process associated with flow diagram 201 of FIG. 2B. At 332, a resource (e.g. resource 210) may be loaded from a resource location. At 334, a registration request may be received from a resource user (e.g., resource user 214). The resource user may be associated with a real user (e.g., real user 216). The registration request may be received at a resource owner (e.g., resource owner 212) associated with the resource. The registration request may include identifying information for the resource user and/or real user.

At 336, the resource user may be registered. The registration may include marking the resource as registered to the resource user (or real user). The registration may be made using a registration list (e.g., registration list 134). At 338, a first unload request may be received. The unload request may be triggered by a component (e.g., a server, cleanup task, etc.) associated with the resource. A determination may be made that the resource is registered to the resource owner or resource user. The determination may be made based on the registration list indicating the registration of the resource user. Based on the determination that the resource is registered, the unload request may be denied at 340. Based on the denial, an intended action (e.g., a deletion or unloading of the resource) may prevented (e.g., not triggered). By preventing actions while the resource is registered, server crashes may be prevented or mitigated.

At 342, a stop request may be generated. The stop request may initiate an unregister process of the resource, so that the intended action can be carried out. At 344, the stop request may be transmitted to the resource user. At 346, a null use determination may be made. The null use determination may be based on the resource user not having used the resource after registration at 336 until the stop use request is transmitted at 344. The null use may be identified by referencing a use log that identifies when resource user has used the resource. Based on the null use determination at 346, a deregistration (unregister) request may be received from the resource user at 348, based on the stop use request. For example, a null use determination at 346 may indicate that a resource user 214 is registered (e.g., at registration list 134), but has not used resource 210. The resource user may be deregistered (e.g., from registration list 134). The registration list may be updated to implement the deregistration. At 350, a second unload request may be received. The second unload request may be triggered by a component (e.g., a server, cleanup task, etc.) associated with the resource. A determination may be made that the resource is not registered to the resource owner or resource user, based on the deregistration at 348. Based on the determination, the second unload request may be approved at 352, and the resource may be unloaded.

Figure 2C:
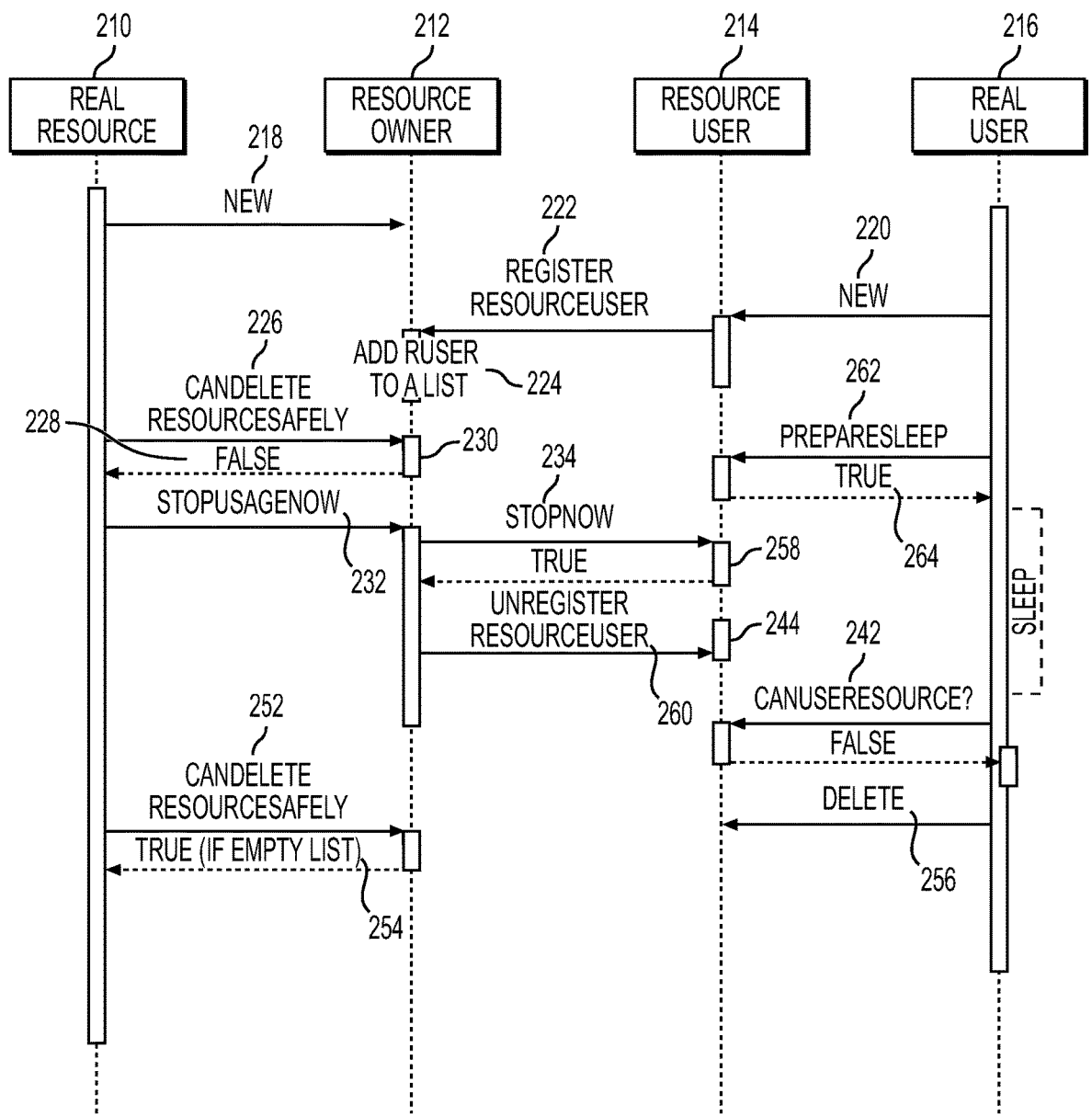
FIG. 2C depicts another flow diagram for resource allocation, according to one or more embodiments.

FIG. 2C depicts a flow diagram 202 for resource allocation. Flow diagram 202 is similar to flow diagram 200 of FIG. 2A. However, in flow diagram 202, an implementation where real user is in a sleep state is described. For example, in FIG. 2C, when compared to FIG. 2A, real user 216 enters a sleep state at 262 (further described herein). A determination that real user 216 is in a sleep state may be made by pinging the real user 216 and receiving a null response (e.g., no response), receiving a sleep state status, and/or based on the sleep state instruction at 262. Accordingly, FIG. 2C describes an implementation where real user 216 is in sleep state and may not be currently using resource 210. The implementation disclosed in FIG. 2C allows for severance of a real user 216's registration without waiting for the real user to awaken from a sleep state. For completeness, references identified in FIG. 2A are repeated below in reference to FIG. 2C. It will be understood that a reference with the same reference number may be similarly applied in both FIG. 2A and FIG. 2C.

At 218 of FIG. 2C, a resource 210 may be transmitted and may be received at a resource owner 212. Resource 210 may be received at resource owner 212 via a transmission of resource 210, based on an indication of availability of resource 210, based on a pointer to a resource location, or the like. Resource owner 212 may have access to or initiate a registration list 134 based on receiving the resource 210. At 220, real user 216 may transmit a new resource request 220 to resource user 214. The request 220 may be transmitted automatically based on a call for resource 210 at real user 216. Request 220 may identify resource 210 or resource user 214 may decipher request 220 to extract the identity of resource 210.

At 222, resource user 214 and/or real user 216 may be registered at resource owner 212. The registration may be triggered by the registration request at 222. A successful or unsuccessful registration may be indicated to resource user 214. For example, resource user 214 may receive an indication that the registration was unsuccessful or was successful. At 224, the registration may be recorded (e.g., a binary register or software designation) at registration list 134 managed at resource user owner 212. The registration may include resource 210 information, resource user 214 information, real user 216 information, a time stamp, and/or resource type information.

At 230, after recording the registration at 224, the resource 210 may be locked (e.g. loaded) such that one or more actions (e.g., deletion request 226) of the resource 210 requested by a resource 210 component (e.g., a server) may be rejected at 228. The rejection 228 may be made based on an indication at resource owner 212 that the registration list 134 currently indicates resource user 214 and/or real user 216 as registering resource 210 or being registered for use of resource 210. For example, a review of registration list 134 may indicate the registration, and the indication of the registration may result in rejection 228.

At 232, a resource 210 component (e.g., server, clean-up operation, shut down operation, etc.) may trigger a stop usage now request 232. The stop usage now request 232 may be triggered based on the rejection 228 to the action (e.g., deletion request 226). Resource owner 212 may submit a stop now instruction 234 based on the stoppage usage now request 232. The stop now instruction 234 may be provided to resource user 214.

At 262, real user may send a prepare sleep instruction to resource user 214. An affirmative response (e.g., true 264) may be returned by resource user 214 and real user 216 may enter a sleep state.

At 258, a determination may be made that real user 216 is in a sleep state based on the prepare sleep instruction at 262. Based on determining that the real user 216 is in a sleep state, stop now instruction 234 may result in an affirmative response. An unregister user command 260 may be sent from resource owner 212 to resource user 214, based on real user 216 being in the sleep state.

Resource user 214 may determine, at 244 that stop now instruction 234 has been received. A resource use request 242 by real user 216 to resource user 214 may be received at resource user 214. Resource user 214 may reject resource use request 242 based on determining, at 244, that the stop now instruction 234 has been received. As a result of the rejection, resource 210 and/or the registered access to resource 210 may be deleted at 256. The deletion may be recorded and/or accepted by resource user 214. Registration list 134 may be updated to unregister resource user 214 and/or real user 216.

At 252, a request one or more actions (e.g., deletion request) of the resource 210 may be received at resource owner 212, from resource 210 and/or a component associated with resource 210. At 254, based on the removal of real user 216 and/or resource user 214 from registration list 134, an affirmative response (e.g., true 254) may be received from resource owner 212.

Accordingly, based on flow diagram 202, resource 210 may be used by a real user 216 via resource user 214. The use of resource 210 may be uninterrupted by, for example, a deletion or action related to resource 210. The stop now request 234 may be prioritized based on real user 216 not having used resource 210. Further, based on flow diagram 202, an action triggered by a component (e.g., a server, a cleanup task, etc.) may not be executed until resource 210 is unregistered from real user 216. By preventing such action until resource 210 is unregistered from real user 216, server crashes may be prevented or mitigated. For example, a cleanup task may not delete resource 210 while real user 216 is registered for using resource 210. By preventing or mitigating server crashes, one or more resources (e.g., processors, servers, databases, etc.) may continue to operate as required. Such operation may increase reliability of the one or more resources and may increase uptime (e.g., the amount of time the resource is available for use).

Figure 3C:
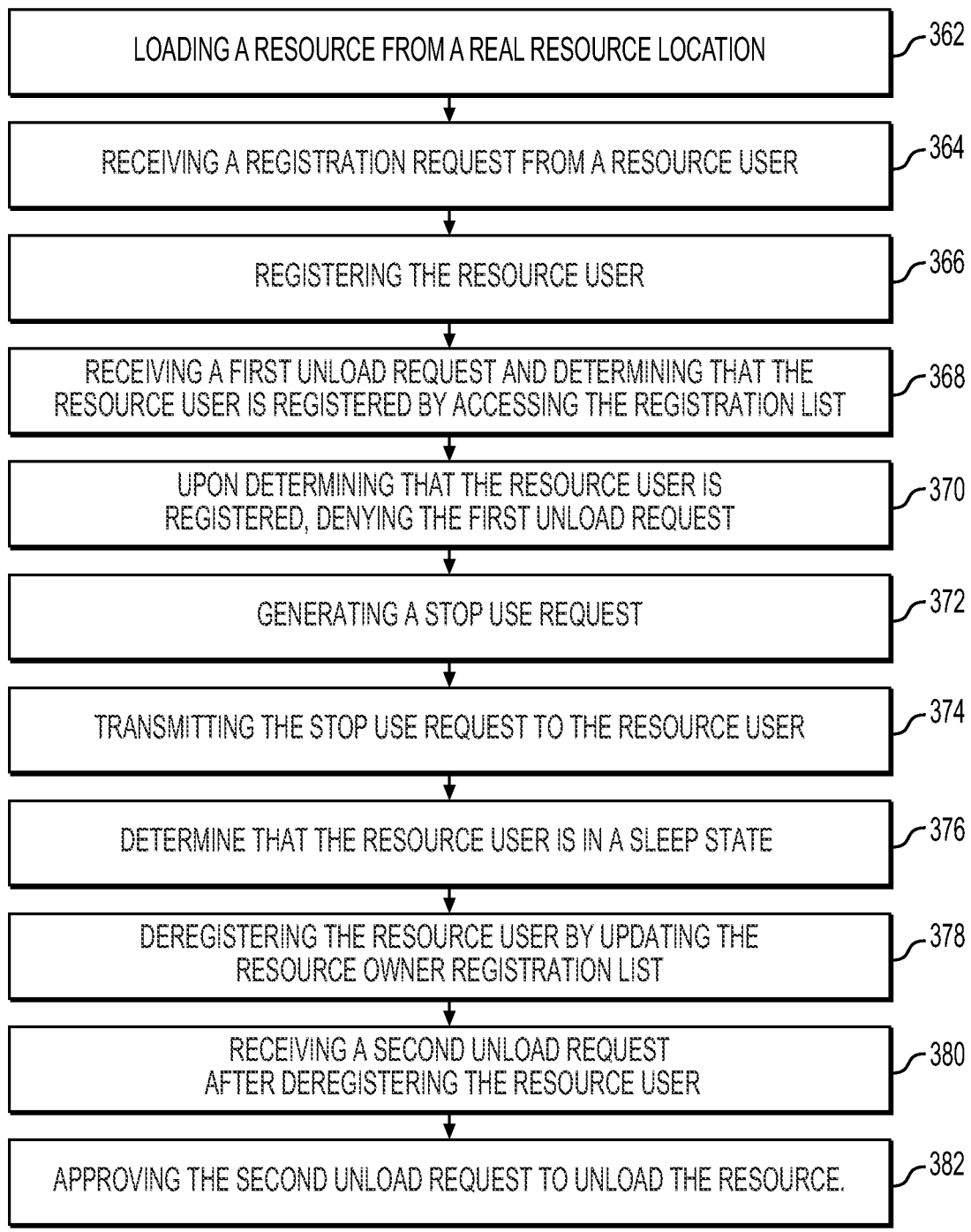
FIG. 3C depicts a flow flowchart corresponding to FIG. 2C, according to one or more embodiments.

FIG. 3C depicts a flowchart 360 for a process associated with flow diagram 202 of FIG. 2C. At 362, a resource (e.g. resource 210) may be loaded from a resource location. At 364, a registration request may be received from a resource user (e.g., resource user 214). The resource user may be associated with a real user (e.g., real user 216). The registration request may be received at a resource owner (e.g., resource owner 212) associated with the resource. The registration request may include identifying information for the resource user and/or real user.

At 366, the resource user may be registered. The registration may include marking the resource as registered to the resource user (or real user). The registration may be made using a registration list (e.g., registration list 134). At 368, a first unload request may be received. The unload request may be triggered by a component (e.g., a server, cleanup task, etc.) associated with the resource. A determination may be made that the resource is registered to the resource owner or resource user. The determination may be made based on the registration list indicating the registration of the resource user or resource owner. Based on the determination that the resource is registered, the unload request may be denied at 370. Based on the denial, an intended action (e.g., a deletion or unloading of the resource) may prevented (e.g., not triggered). By preventing actions while the resource is registered, server crashes may be prevented or mitigated.

At 372, a stop request may be generated. The stop request may initiate an unregister process of the resource, so that the intended action can be carried out. At 374, the stop request may be transmitted to the resource user. At 376, determination that the real user is in a sleep state may be made. The state determination may be based on identifying a status of the real user. The status may be identified by pinging the real user and may be indicated based on a lack of a response or based on a response indicating a current sleep state status. Based on the sleep state determination at 376, a deregistration (unregister) request may be received from the resource user at 378, based on the stop use request. The resource user may be deregistered (e.g., from registration list 134). The registration list may be updated to implement the deregistration. At 380, a second unload request may be received. The second unload request may be triggered by a component (e.g., a server, cleanup task, etc.) associated with the resource. A determination may be made that the resource is not registered to the resource owner or resource user, based on the deregistration at 378. Based on the determination, the second unload request may be approved at 382, and the resource may be unloaded.

According to implementation, the resource state query (e.g., at 226 and/or 252 of FIGS. 2A-2C) may be made upon a determination that a given amount of time has elapsed since the transmission of stop now instruction. The elapsed time may be predetermined or dynamically determined based on, for example, the resource type. Alternatively, the elapsed time may be determined during registration (e.g., at 222) and may be an amount of time requested by the real user or resource user.

Figure 4:
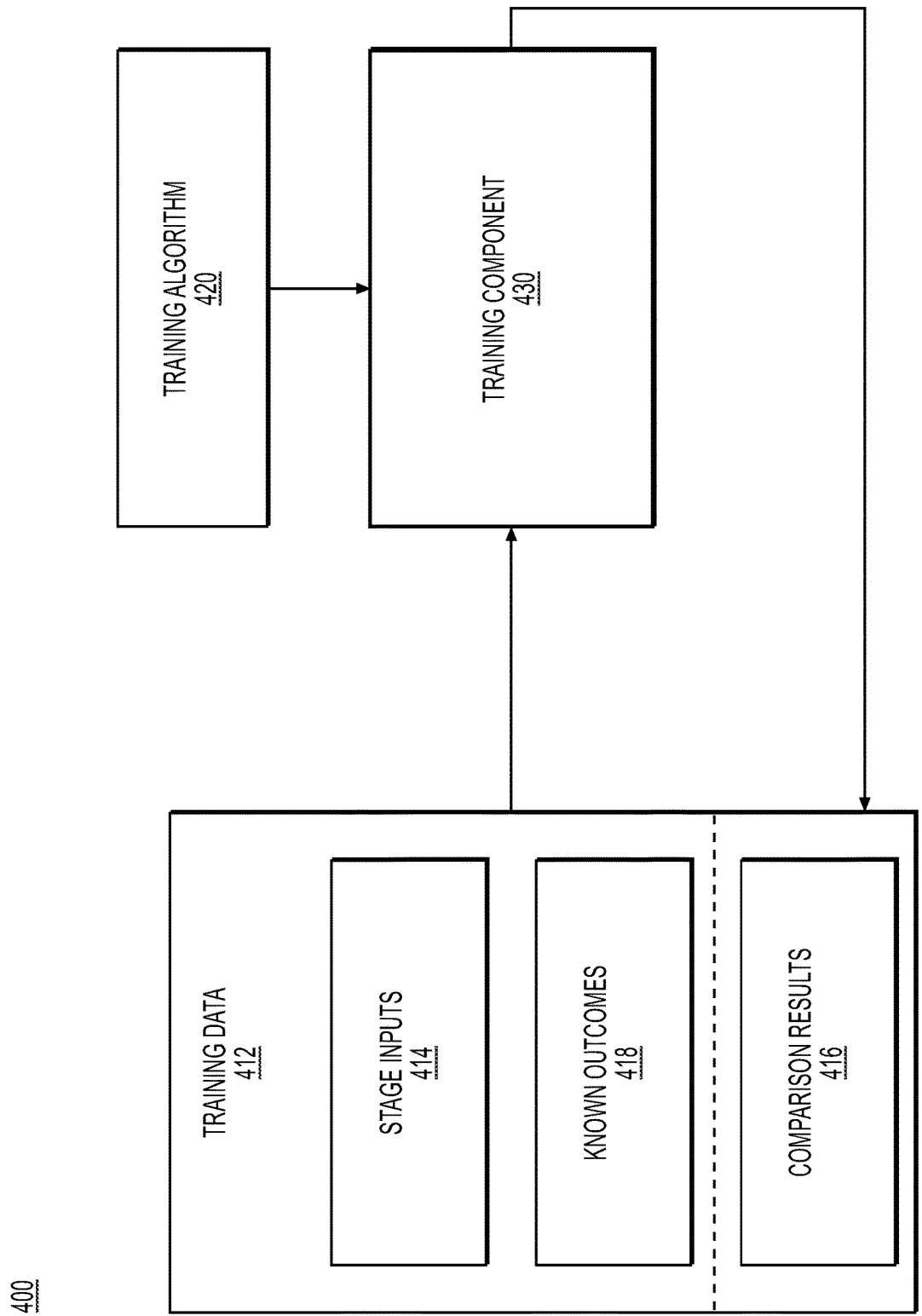
FIG. 4 depicts a machine learning model training flow, according to one or more embodiments.

One or more implementations disclosed herein may be applied by using a machine learning model. For example, a machine learning model may be used to determine a delay period and/or a length of time before issuing a stop usage request. A machine learning model disclosed herein may be trained using the data flow 400 of FIG. 4. As shown in FIG. 4, training data 412 may include one or more of stage inputs 414 and known outcomes 418 related to a machine learning model to be trained. The stage inputs 414 may be from any applicable source including resource type, resource owner, resource user, real user, a stage output (e.g., one or more outputs from a step from FIGS. 2A-3C). The known outcomes 418 may be included for machine learning models generated based on supervised or semi-supervised training. An unsupervised machine learning model might not be trained using known outcomes 418. Known outcomes 418 may include known or desired outputs for future inputs similar to or in the same category as stage inputs 414 that do not have corresponding known outputs.

The training data 412 and a training algorithm 420 may be provided to a training component 430 that may apply the training data 412 to the training algorithm 420 to generate a machine learning model. According to an implementation, the training component 430 may be provided comparison results 416 that compare a previous output of the corresponding machine learning model to apply the previous result to re-train the machine learning model. The comparison results 416 may be used by the training component 430 to update the corresponding machine learning model. The training algorithm 420 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

In general, any process or operation discussed in this disclosure that is understood to be computer-implementable, such as the flows and/or process illustrated in FIGS. 2A-3C, etc., may be performed by one or more processors of a computer system, such any of the systems or devices in the environment of FIG. 1 as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Figure 5:
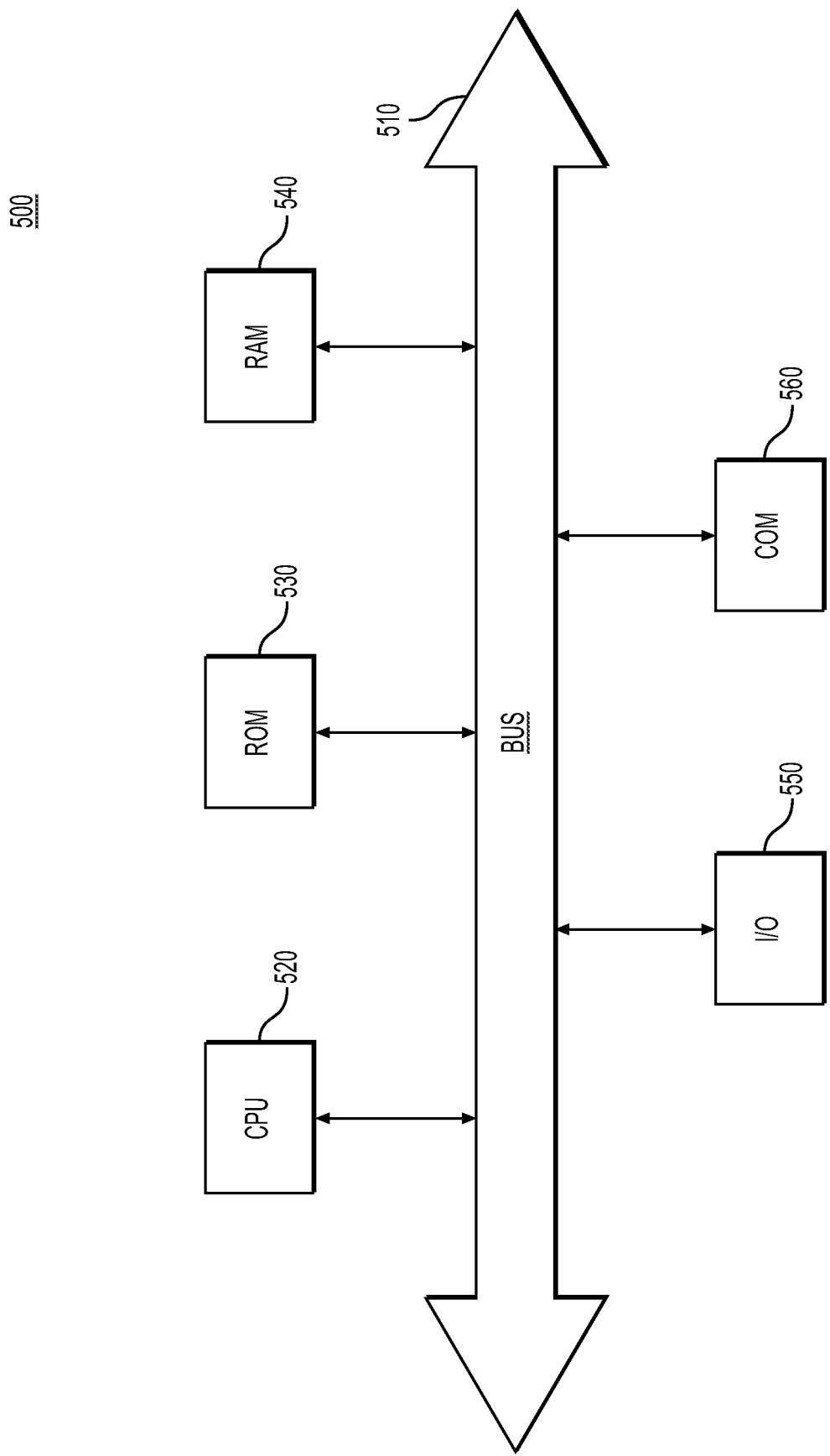
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   at least one memory storing instructions; and
   at least one processor executing the instructions to perform operations, the operations comprising:
   loading a resource from a real resource location;
   receiving a registration request from a resource user;
   registering the resource user by updating a resource owner registration list to indicate the resource user registration;
   receiving a first unload request and determining that the resource user is registered by accessing the registration list;
   upon determining that the resource user is registered, denying the first unload request;
   generating a stop use request;
   transmitting the stop use request to the resource user;
   receiving a deregistration request from the resource user, based on the stop use request;
   deregistering the resource user by updating the resource owner registration list;
   receiving a second unload request after deregistering the resource user; and
   approving the second unload request to unload the resource.

2. The system of claim 1, wherein the registration request is originated from a real user.

3. The system of claim 1, wherein updating the resource owner registration list comprises modifying a binary value associated with the resource.

4. The system of claim 1, further comprising deleting the resource from the resource user after deregistering the resource user.

5. The system of claim 1, wherein the stop use request is generated based on a project unload.

6. The system of claim 1, wherein the stop use request is generated based on an cleanup operation.

7. The system of claim 1, wherein the operations further comprise:
receiving a resource use request at the resource user;
determining that the stop use request has been received at the resource user; and
denying the resource use request.

8. The system of claim 7, wherein the deregistration request from the user is based on denying the resource use request.

9. The system of claim 1, wherein the operations further comprise:
receiving a resource use request at the resource user;
determining that the stop use request has not been received at the resource user; and
denying the resource use request.

10. A system comprising:
at least one memory storing instructions; and
at least one processor executing the instructions to perform operations, the operations comprising:
loading a resource from a real resource location;
receiving a registration request from a resource user;
registering the resource user by updating a resource owner registration list to indicate the resource user registration;
receiving a first unload request and determining that the resource user is registered by accessing the registration list;
upon determining that the resource user is registered, denying the first unload request;
generating a stop use request;
transmitting the stop use request to the resource user;
determine a null use of the resource by the resource user;
deregistering the resource user by updating the resource owner registration list, based on the null use;
receiving a second unload request after deregistering the resource user; and
approving the second unload request to unload the resource.

11. The system of claim 10, wherein null use of the resource by the resource user is determined by accessing a use log.

12. The system of claim 10, wherein the registration request is originated at a real user.

13. The system of claim 10, wherein updating the resource owner registration list comprises modifying a binary value associated with the resource.

14. The system of claim 10, wherein the options further comprise deleting the resource from the resource user after deregistering the resource user.

15. The system of claim 10, wherein the stop use request is generated based on a project unload.

16. A system comprising:
at least one memory storing instructions; and
at least one processor executing the instructions to perform operations, the operations comprising:
loading a resource from a real resource location;
receiving a registration request from a resource user;
registering the resource user by updating a resource owner registration list to indicate the resource user registration;
receiving a first unload request and determining that the resource user is registered by accessing the registration list;
upon determining that the resource user is registered, denying the first unload request;
generating a stop use request;
transmitting the stop use request to the resource user;
determining that the resource owner is in a sleep state;
deregistering the resource user by updating the resource owner registration list, based on the determining that the resource owner is in a sleep state;
receiving a second unload request after deregistering the resource user; and
approving the second unload request to unload the resource.

17. The system of claim 16, wherein determining that the resource owner is in a sleep state is based on one of a null response or a sleep state status response.

18. The system of claim 16, wherein determining that the resource owner is in a sleep state is based on a sleep state instruction.

19. The system of claim 16, wherein the registration request is originated at a real user.

20. The system of claim 16, wherein updating the resource owner registration list comprises modifying a binary value associated with the resource.

* * * * *